Feb. 7, 1939.　　　　F. BISZANTZ　　　　2,146,107
VEHICLE
Filed March 31, 1938　　　4 Sheets-Sheet 1
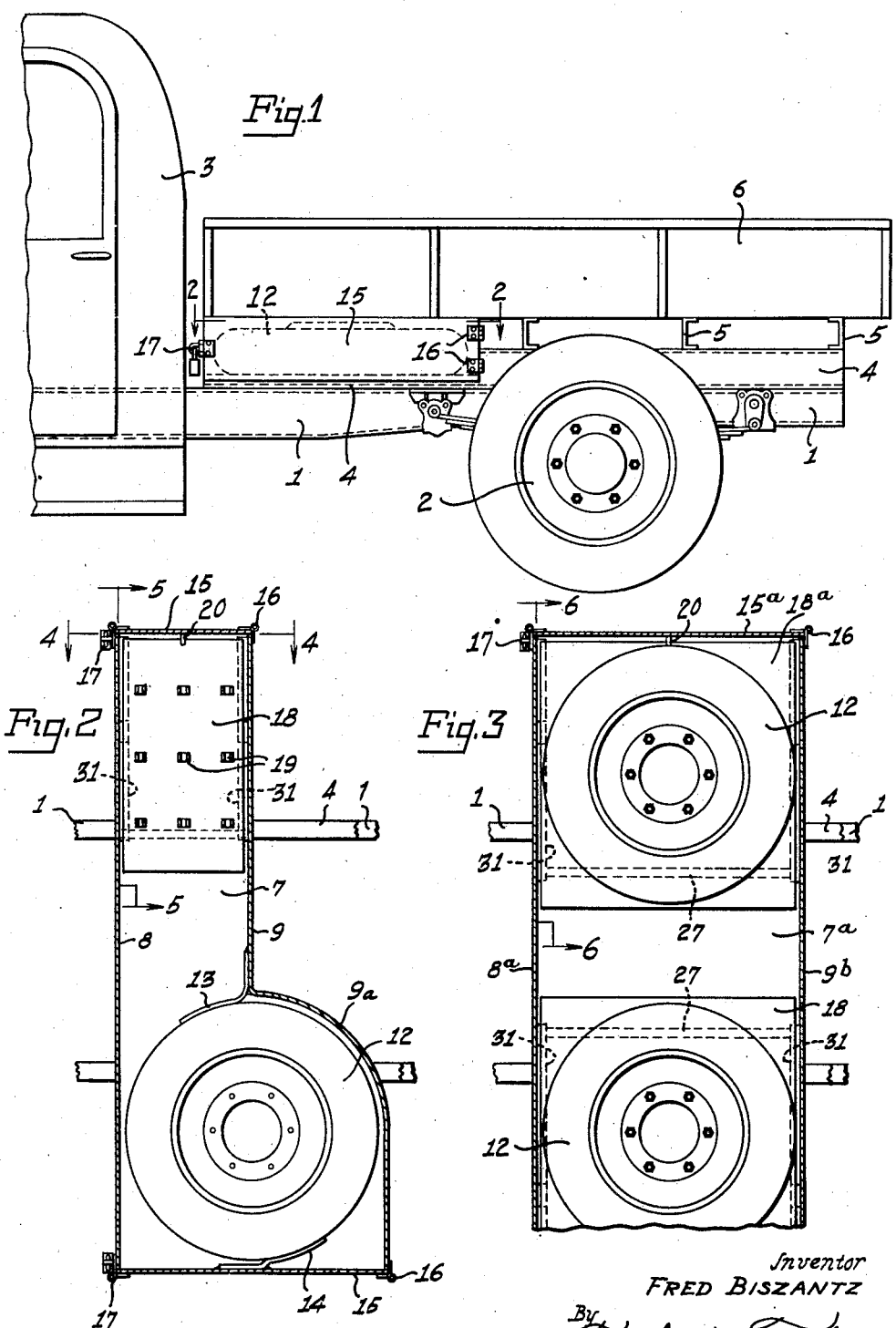
Inventor
FRED BISZANTZ
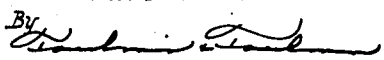
Attorneys Feb. 7, 1939.    F. BISZANTZ    2,146,107
VEHICLE
Filed March 31, 1938    4 Sheets-Sheet 2
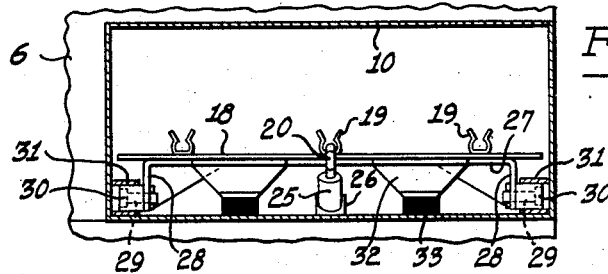
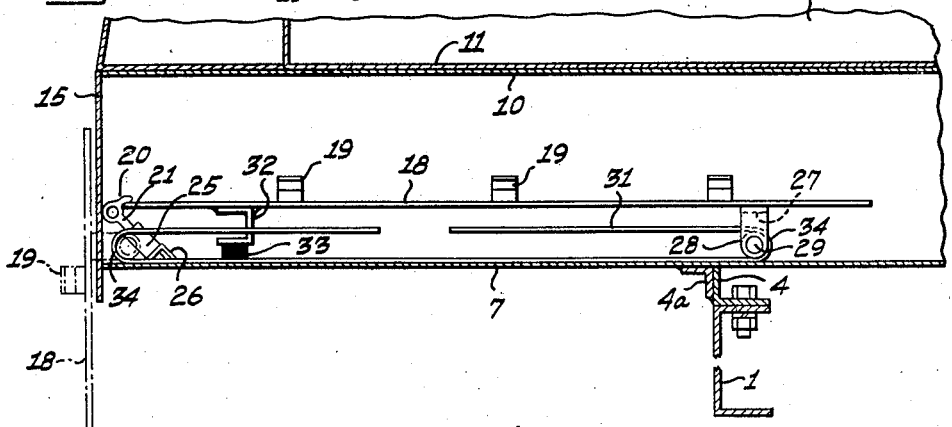
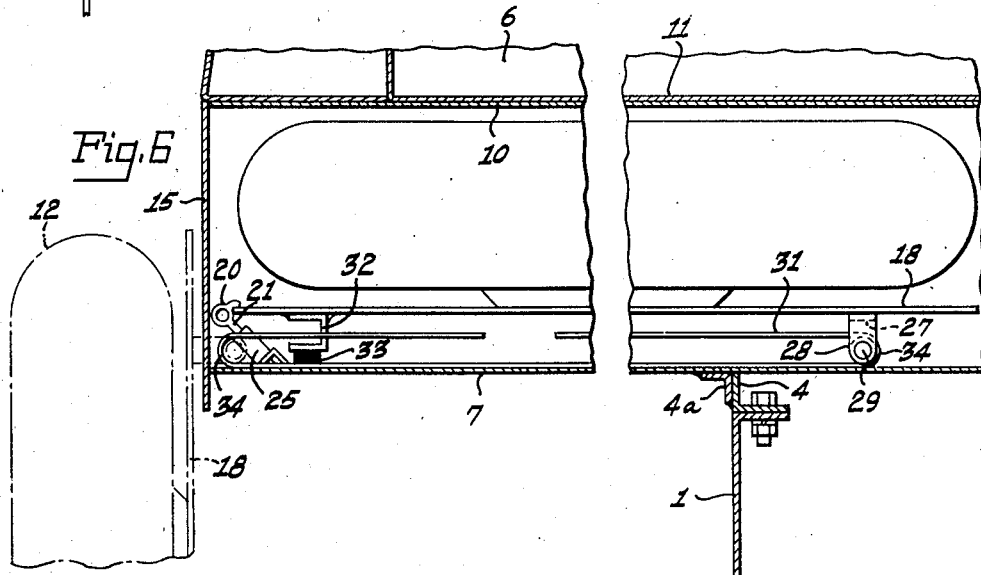
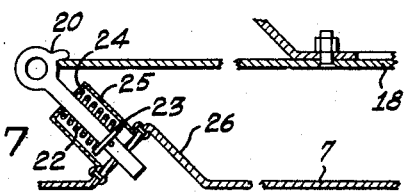
Inventor
FRED BISZANTZ
By
Attorneys Feb. 7, 1939.  F. BISZANTZ  2,146,107
VEHICLE
Filed March 31, 1938  4 Sheets-Sheet 3
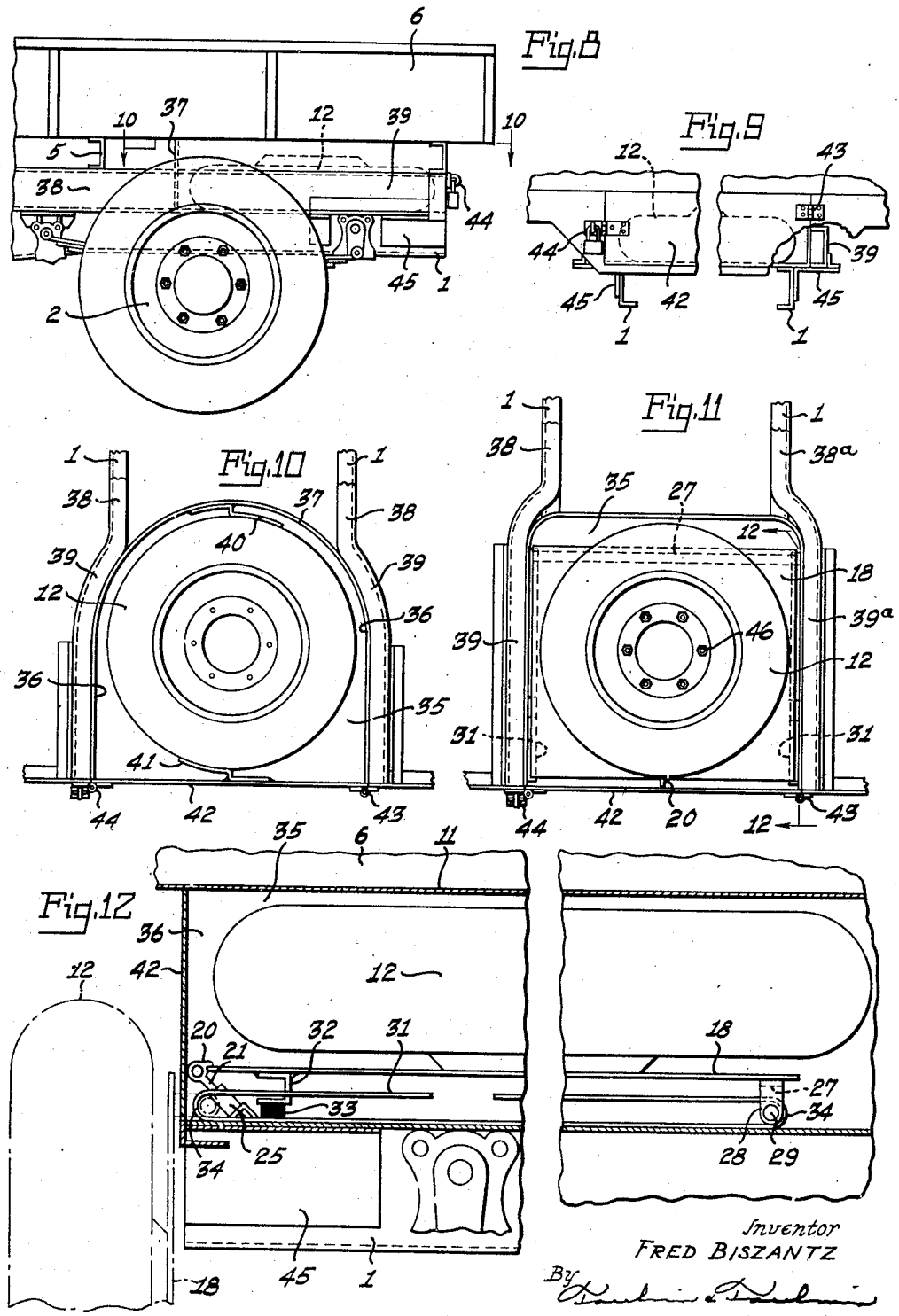
Inventor
FRED BISZANTZ
By [signature]
Attorneys Feb. 7, 1939.  F. BISZANTZ  2,146,107
VEHICLE
Filed March 31, 1938  4 Sheets-Sheet 4
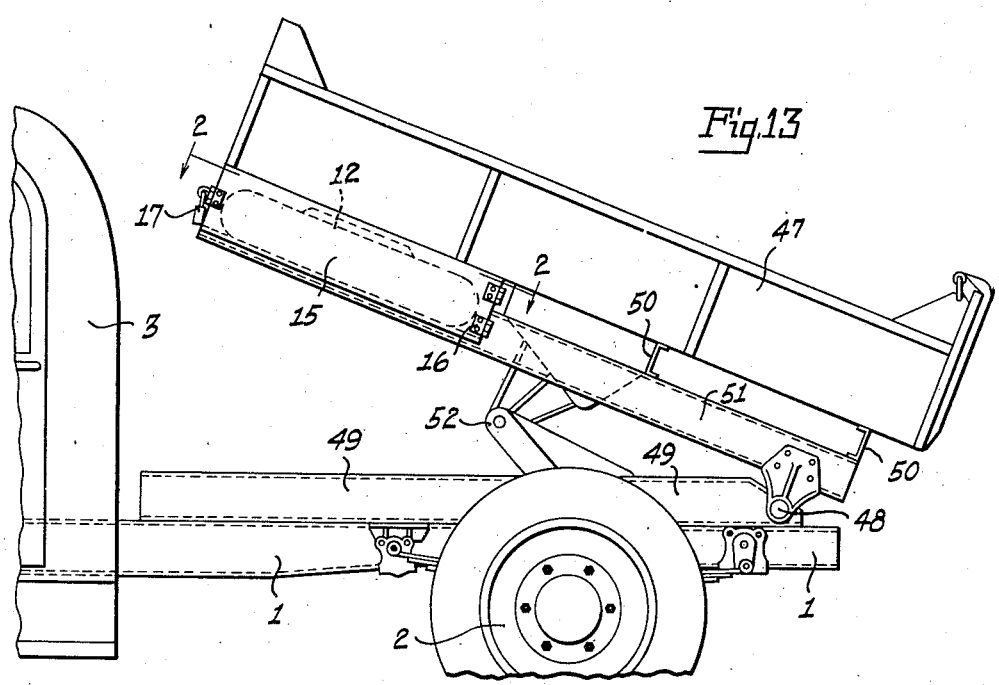
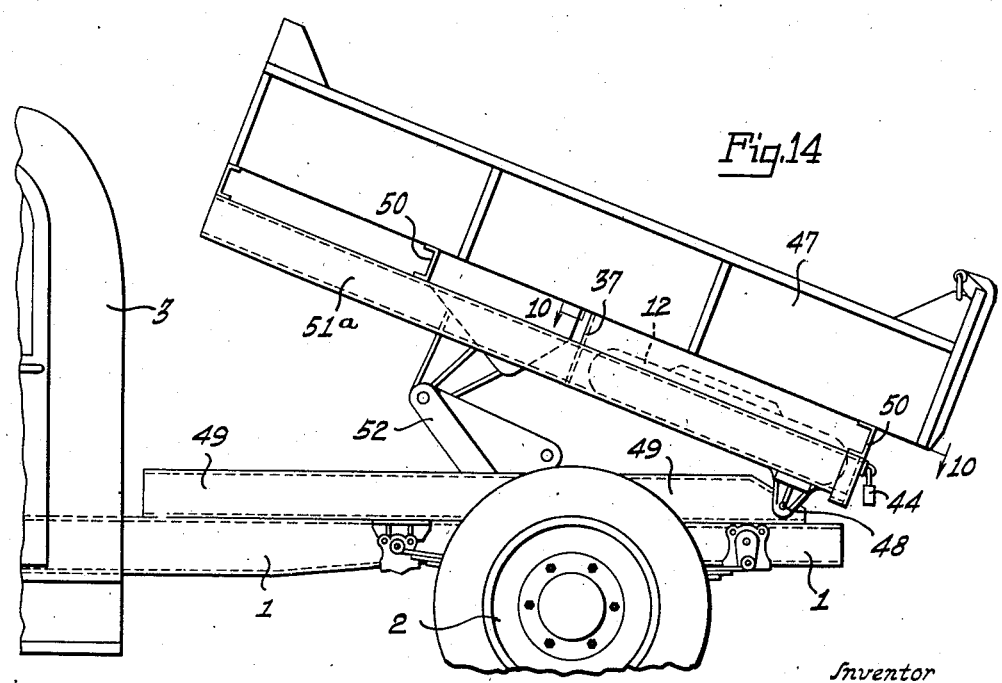
Inventor
FRED BISZANTZ
By
Attorneys Patented Feb. 7, 1939

2,146,107

UNITED STATES PATENT OFFICE 2,146,107

VEHICLE

Fred Biszantz, Galion, Ohio, assignor to The Galion Metallic Vault Company, Galion, Ohio, a corporation of Ohio Application March 31, 1938, Serial No. 199,214

6 Claims. (Cl. 298—1)

My invention relates to vehicles and, in particular, to cargo-carrying vehicles and means for transporting tires, tools and the like.

Heretofore, it has been a problem to properly store and convey tires, tools and similar equipment used with cargo-carrying bodies that were either stationary or tilting. The chassis has mounted upon it the usual cab, motor and housing therefor, which does not provide any adequate space for the storage of tools nor any means for protecting the tools or tires from the elements.

It is an object of this invention to provide means for carrying tires, excavating tools and the like, which are needed on the road in connection with either stationary bodies or dump bodies. For this purpose, there is provided for both types of bodies adequate supports for such tires and tools to prevent their rattling and injury during transit.

In particular, it is an object of this invention to provide means by which such tires and tools may be stored in relatively shallow compartments and can be readily withdrawn from said compartments and brought into a vertical position from a horizontal position so as to facilitate the loading and unloading of tires and tools within said compartments. Otherwise, the compartments being long and shallow, it is difficult to mount the tires and tools within such compartments without rattling. This is particularly true of compartments which are carried with tilting bodies, where it is necessary to firmly anchor such equipment within the storage compartments.

Another object of this invention is to provide a sliding bottom as a carrier for tools or tires which can assume, when withdrawn from the compartment, a vertical position, either at the side or on the rear of the truck so that it is easy to mount and de-mount tools and tires in a vertical position and thereafter slide them in a horizontal position into the compartment, where they are securely fastened in a horizontal position.

Referring to the drawings:

Figure 1 is a side elevation of a stationary body with a horizontal compartment for the storage of tires or tools or both with means for maintaining them in a predetermined position;

Figure 2 is a section on the line 2—2 of Figure 1 and of Figure 13, looking in the direction of the arrows;

Figure 3 is a section on the same line in Figure 1 and in Figure 13, showing a modified form of tire carrier and storage compartment;

Figure 4 is a section on the line 4—4 of Figure 2, looking in the direction of the arrows;

Figure 5 is a section on the line 5—5 of Figure 2, looking in the direction of the arrows;

Figure 6 is a section on the line 6—6 of Figure 3, looking in the direction of the arrows;

Figure 7 is a detail of the movable carrier locking device shown in elevation in Figure 6;

Figure 8 is a side elevation of a body having a rear entrance tire carrier beneath the body;

Figure 9 is a rear elevation thereof;

Figure 10 is a section on the line 10—10, looking in the direction of the arrows, of Figure 8 and of Figure 14;

Figure 11 is a section on the line 10—10 of Figure 8 and of Figure 14, looking in the direction of the arrows, but showing a modified form of tire support which can be removed and which can assume a vertical position;

Figure 12 is a section on the line 12—12, looking in the direction of the arrows, of Figure 11;

Figure 13 is a side elevation of a tilting dump body, in its tilting position, showing the means and the arrangement by which the tire storage and tool storage compartment, shown in Figures 2 and 3, can be carried beneath a tilting body; and Figure 14 is a side elevation of a tilting body truck, showing the arrangement with the tilting body of a tire storage compartment, access to which is gained from the rear of the truck.

Referring to the drawings in detail, I designates the frame members of the chassis frame having wheels 2 and a cab 3. A sub-frame having members 4 is mounted directly upon the longitudinal truck frame members 1. Mounted upon these sub-frames 4 are cross frame members 5 which, in turn, support a stationary body 6. As these sub-frame members 4 are notched out at their forward ends, there is left, in the form shown in Figures 1 and 2, a space for a transverse compartment, the depth of the notched portion in the sub-frame 4 and of the transverse frame members 5.

This space is filled with a compartment having a bottom 7, front and rear walls 8 and 9 and a top wall 10 which may be also formed, if desired, by the bottom 11 of the truck body 6, although it is preferred not to do so in order to provide adequate reinforcing and support of the forward end of the body. This compartment may be made of the same width transversely, as in Figure 3, or of different widths, as in Figure 2. In the modification shown in Figure 3, the bottom of the compartment 7a, with its front and rear walls 8a, 9a, door 15a, and false bottom 18a, are of slightly varied forms of similar parts in Figure 2.

It will be noted that, in Figure 2, there is an arcuate wall 9a providing space for the tire 12 which is held in position by the spring clip 13 at its rear end and by a spring clip 14 at its outer end, which latter clip is mounted upon a swinging door 15 hinged at 16 and locked at 17.

The restricted portion of this compartment is provided with a sliding false bottom 18 having clips 19 or other suitable attaching means for supporting tools, either for the truck, or excavating tools.

This false bottom 18 is retained in position by the spring-pressed hook 20 carried on the shaft 21, around which is a spring 22. This spring is mounted upon an abutment 23 on the shaft 21. It is contained between this abutment and the end 24 of a housing 25 which is mounted upon a bracket or a struck-up portion 26 of the floor 7. This false bottom 18 is supported upon the transversely extending plates 27 having downwardly extending ends 28 carrying axles 29, on which are mounted rollers 30 that travel in tracks 31 on the inside of the compartment.

At the forward end of this false bottom 18 is a depending bracket 32 having a rubber cushion 33 for yieldingly supporting the forward end of the false bottom 18, as it is only the rear end which has the transversely extending member 27 with the rollers 30. These track members 30 and 31 are formed at their ends into loops 34 so as to limit the inward and outward movement of the false bottom 18. In its outermost position, the false bottom assumes a vertical position, as shown by dotted lines. This presents the tools, tires, etc., in a vertical position so that they can be easily mounted and de-mounted and then elevated into horizontal position and moved into the compartment. This compartment is supported by the truck frame members 1 and sub-frame members 4 and angle irons 4a. Either tools or tires may be mounted upon this false bottom 18, as desired.

Referring to Figures 8 to 12, these figures show an embodiment of my invention in a space beneath the rear end of the body, which space is accessible from the rear end of the truck.

A compartment 35 is formed by a vertical sheet having side walls 36 and a rounded end 37 that fits within the sub-frame members 38 Figure 10, whose rear ends are curved outwardly at 39 to form embracing structures for positioning the walls 36 and 37 of the compartment 35. The top of this compartment may be formed by the bottom 11 of the truck body 6. The sub-frame members 38a have their rear end portions deflected outwardly as at 39a in Figure 11, in which construction these members are shaped slightly different from those as shown in Figure 10. The tire 2 is held in position by the spring clamps 40 and 41 respectively, mounted upon the curved wall 37 and the rear door 42 which is hinged at 43 and locked at 44.

The sub-frame members 39 are mounted upon a bracket 45 which is attached to the outer sides of the truck frame members 1 so that the rear ends of those sub-frame members are supported thereby. This connection between the bracket 45 and frame members 1 and 39 may be by bolting, riveting or welding.

In Figures 11 and 12 are shown similar arrangements for a rear compartment, but in this case the compartment is provided with a false bottom 18 and its associated mechanism, as explained in connection with Figures 4, 5, 6 and 7. This makes it possible for a tire or tool to be carried in a horizontal position and, when it is desired to have access thereto for mounting or demounting, the false bottom 18 will assume a vertical position.

It is thus possible to fasten conveniently, as by bolts 46, the tire 12 upon the false bottom 18 when the tire is in its vertical position, as in the case of any other tire carrier and to then telescope the tire within the compartment 35 which is just deep enough to comfortably receive the tire in its horizontal position.

In Figures 13 and 14 are shown, respectively, a front tire compartment and a rear tire compartment with a tilting body. The interior arrangements of the front tire compartment are the same as described in connection with Figures 1 to 7, and the rear tire compartment in Figure 14 has the arrangement as in Figures 8 to 12. However, the body 47 is pivoted at 48 on the sub-frame members 49. The body 47 is supported by transverse frame members 50 upon longitudinal frame members 51. The longitudinal frame members 51 Figure 13, and 51a Figure 14, correspond to the sub-frame members 4 of Figure 1 or the sub-frame members 38 and 39 of Figures 8 to 12.

The purpose of Figures 13 and 14 is to illustrate the adaptation of my invention to tilting bodies to show how the compartments will move with the body and form a part thereof when the body is tilted by the elevating mechanism, generally designated 52.

Returning to Figure 3, this figure shows a transverse compartment such as may be employed in Figure 1 or 13, in which the false bottoms 18 are mounted in opposite ends of the compartment, and upon which either a tire 12 or tools may be mounted. This provides for dual tires and the like. The construction of the false bottom and its operation is the same as that described in connection with Figures 4 to 7 inclusive.

It will be understood that I desire to comprehend within my invention such modifications as come within the scope of the claims and the invention.

Having thus fully described my invention, what I claim as new and desire to secure by Letters Patent is:

1. In combination, a truck frame, a body, means located between said frame and body to form a compartment, supplementary means slidable into and out of said compartment for supporting articles therein in predetermined position, and means associated with said compartment for retaining said supplementary means in a horizontal position when in the compartment and in a vertical position when out of the compartment, and means to lock said supplementary means within the compartment as desired.

2. In combination, a body, sub-frame members, a compartment located between said body and said sub-frame members and beneath said body, a truck frame for supporting said body and said compartment, and means in said compartment comprising a false bottom for supporting articles therein in a horizontal position, and means associated therewith for supporting said articles in a vertical position when outside of said compartment.

3. In combination, a body, a compartment formed therebeneath horizontally disposed under said body, a horizontally disposed false bottom therefor, means extending from the rear portion of said false bottom, tracks wholly within the inside of said compartment for cooperating with said means in guiding the false bottom in its movements into and out of said compartment, means near the end of said compartment for arresting the movement of said false bottom and permitting it to swing from a horizontal to a vertical position and retaining it in the latter position, and means for retaining articles on said false bottom.

4. In combination, a truck frame, a body mounted in spaced relation thereto, a transversely arranged compartment enlarged at one end, said compartment being accessible from opposite ends, means for retaining a tire in the enlarged end, a slidable false bottom in the other and narrow end, guiding means wholly within said compartment for said false bottom, and anti-friction means extending from said false bottom and cooperating with said guiding means in confining the movements of said false bottom to horizontally sliding movements, said guiding means including an element for permitting the false bottom to swing into a vertical position and retaining it there, and means for supporting articles upon said false bottom.

5. In combination, a truck frame, a body mounted in spaced relationship thereto, a transversely arranged compartment between said frame and body, means for rendering said compartment accessible at one end, a false bottom within said compartment, devices extending downwardly from said false bottom, guideways engaged by said devices constructed to confine the false bottom to horizontal movement into and out of said compartment, means permitting the false bottom to assume a vertical position outside of said compartment, latching means for engaging with said false bottom for locking it in said compartment, and means for retaining articles on said false bottom.

6. In combination, a truck frame, a body mounted in spaced relationship thereto, a transversely arranged compartment between said frame and body having an open end, a false bottom within said compartment, guiding means projecting from said false bottom, a track located wholly within said compartment for engagement by said guiding means for confining the false bottom to horizontal movements within the compartment, a depending bracket at the forward end of said false bottom having cushioning means for yieldingly supporting said false bottom, means at the extremity of said track for limiting the movement of said false bottom out of the compartment and constructed to permit such false bottom to swing from a horizontal into a vertical position when it moves outside of the compartment.

FRED BISZANTZ.